United States Patent Office 2,879,798
Patented Mar. 31, 1959

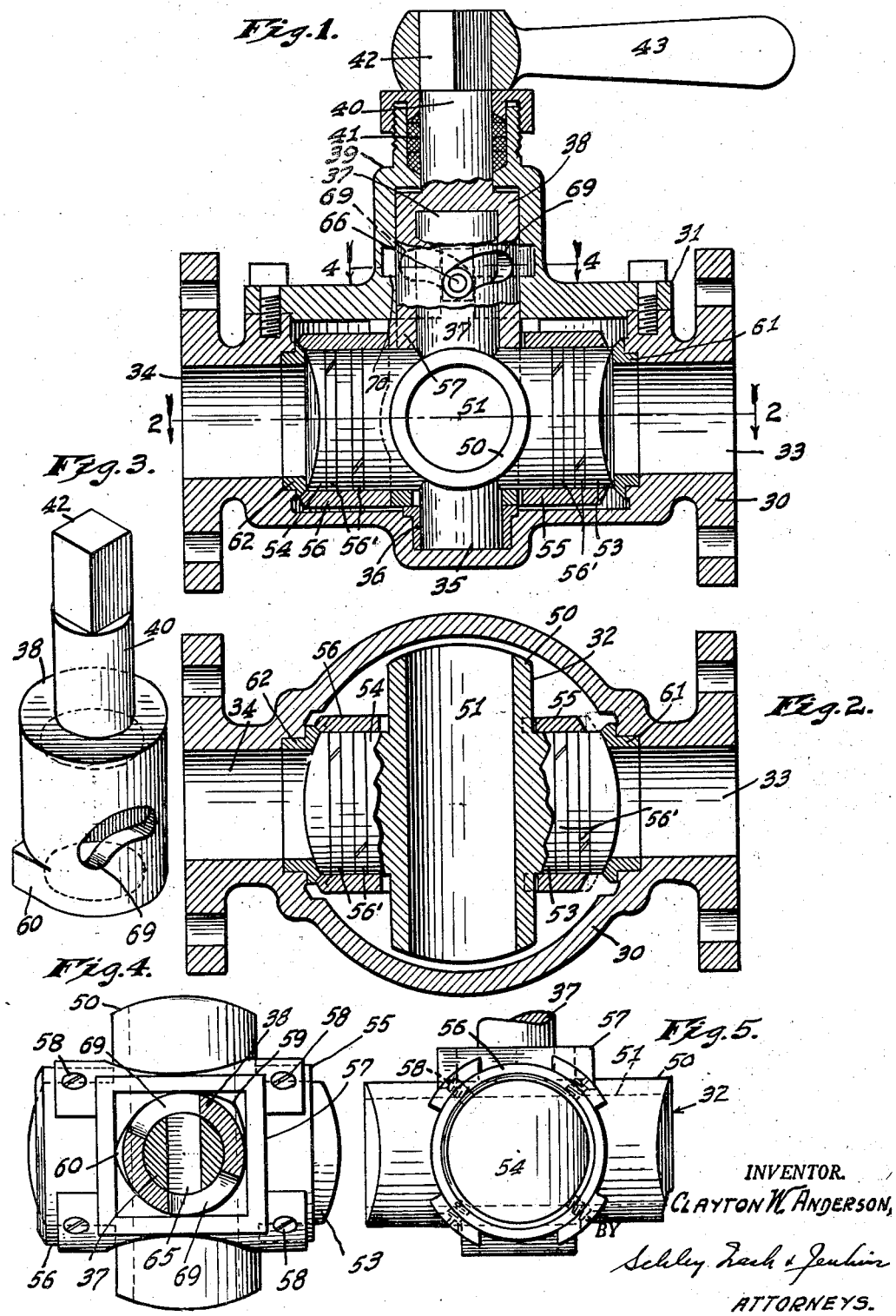

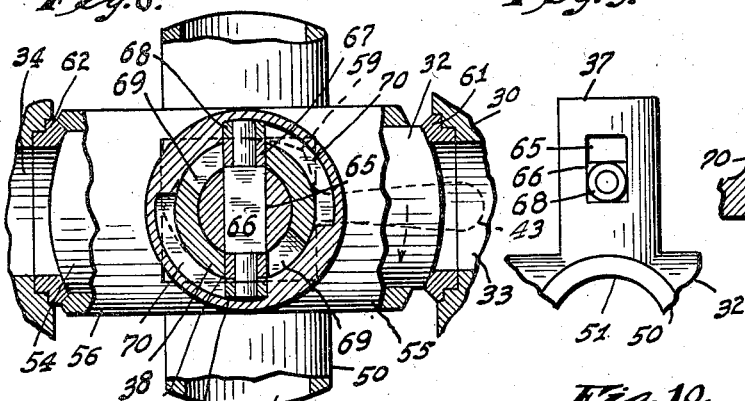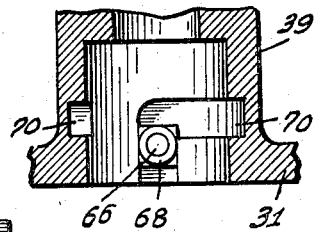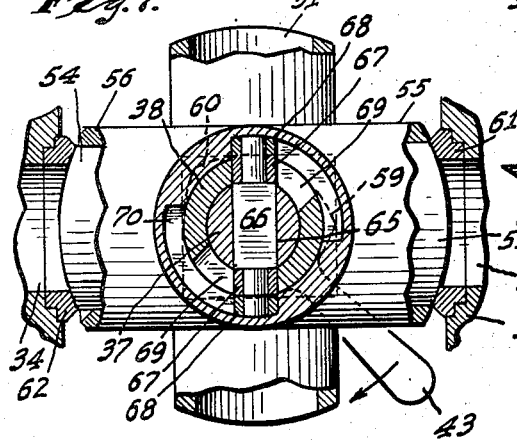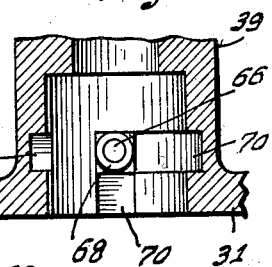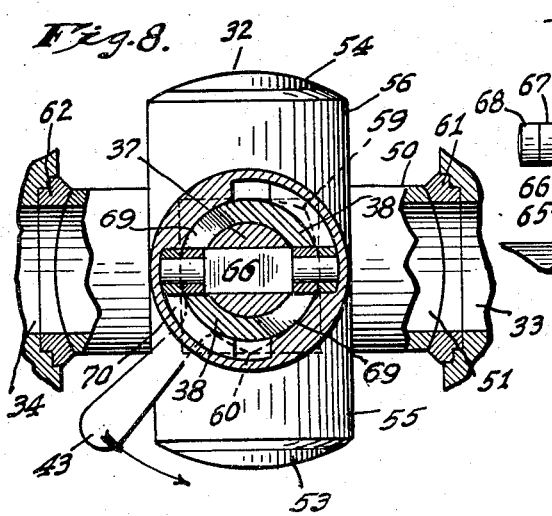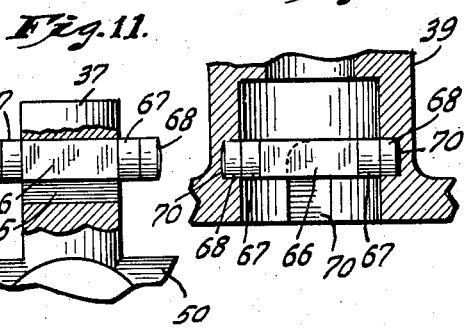

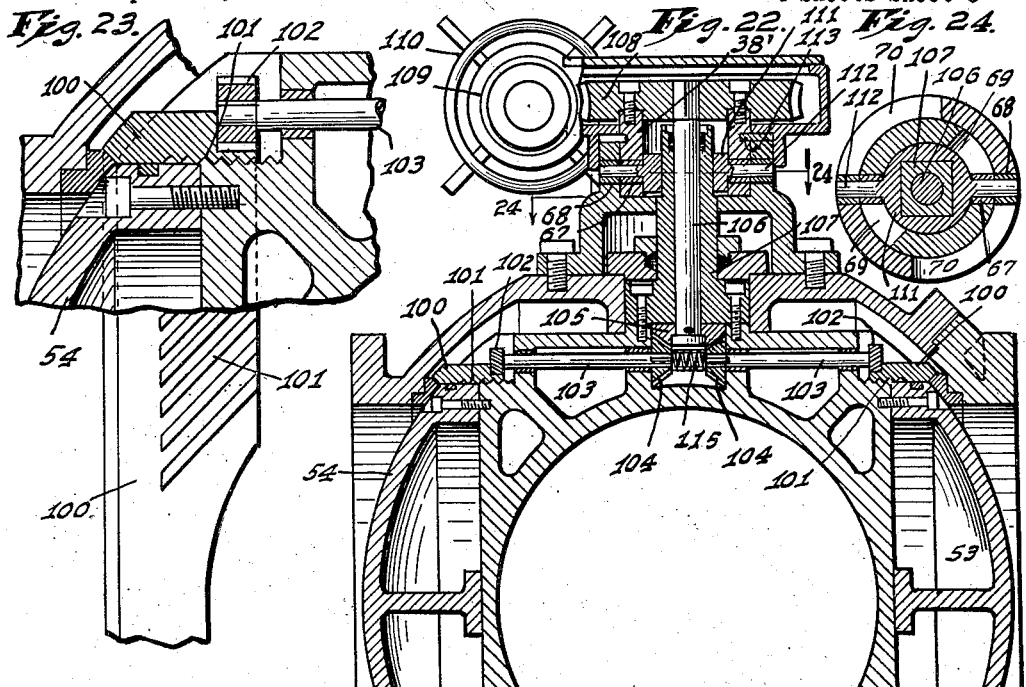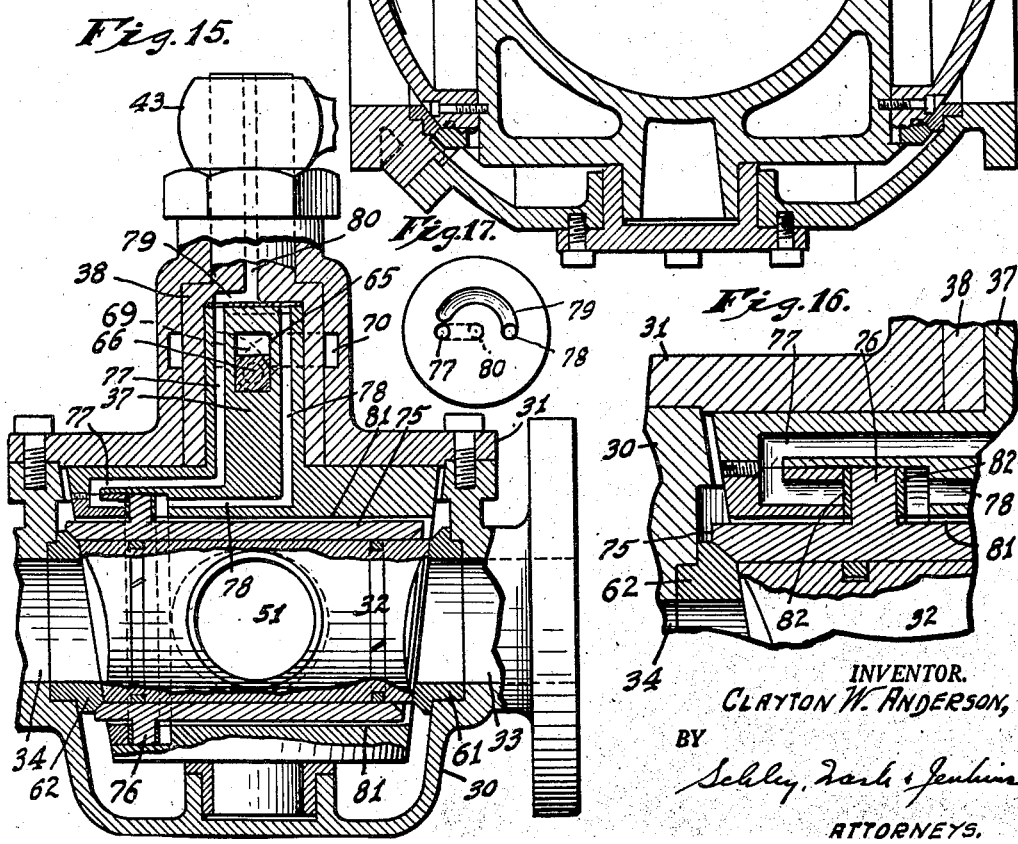

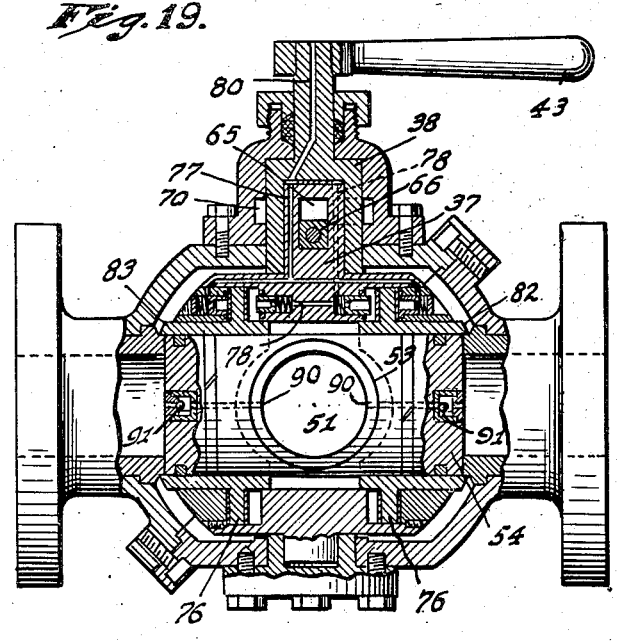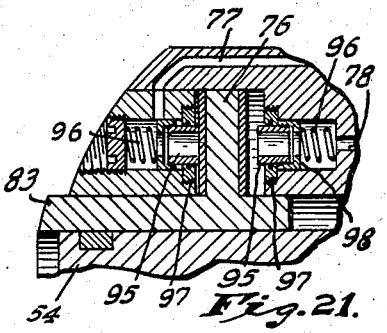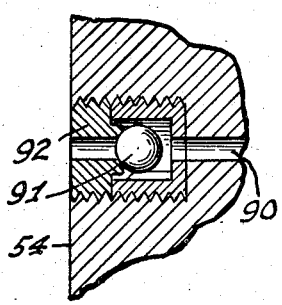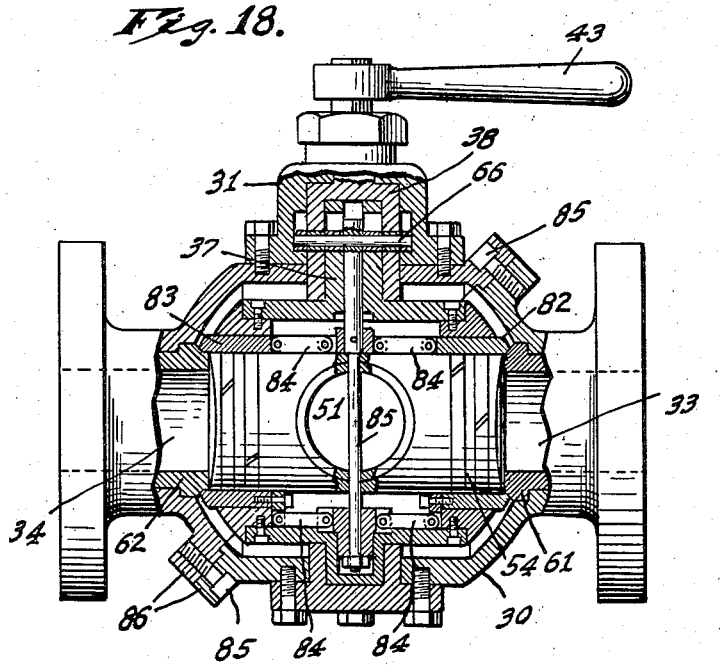

2,879,798
VALVE
Clayton W. Anderson, Marion, Ind.
Application April 20, 1953, Serial No. 349,759
12 Claims. (Cl. 137—628)

My invention relates to rotary valves for controlling the flow of fluids, and especially of liquids, by rotation between closed and open positions.

It is the object of my invention to provide a rotary valve which has a minimum of flow restriction, is balanced in design for handling differential pressures, requires few parts and thus promotes economy in production, is easy to operate and certain in its operation, provides effective positive valve closure and does so without raising unduly the strain on the valve-casing, and has that positive closure enhanced by the fluid pressure of the line.

In general, my improved valve has a valve-casing having an inlet port and an outlet port, usually diametrically opposite each other; a turntable valve-plug having an open position in which it provides a fluid passage between the inlet and outlet ports and a closed position in which it closes that fluid passage; a sealing sleeve, desirably carried by that valve-plug, and movable with respect to both the valve-plug and the valve-casing when the valve-plug is in closed position to and from a sealing seat surrounding at least one of the ports, preferably the outlet port, said sealing sleeve preferably having such surfaces exposed to the pressure within the valve-casing that that pressure tends to seat said sealing sleeve when the valve is closed; and operating mechanism for said valve-plug for successively unseating the sealing sleeve and turning the valve-plug in opening the valve and for successively turning the valve-plug and seating the sealing sleeve in closing the valve.

In its simplest form, my valve is wholly manually operated. This is the preferred form for low-pressure valves especially of the smaller sizes. In this form the power for turning the valve-plug and for the initial seating and the unseating of the sealing sleeve is furnished by hand, although, preferably, fluid pressure within the valve-casing enhances and maintains the seating.

In high-pressure valves and larger valves, however, the seating and unseating of the sealing sleeve is preferably done by fluid pressure; and the operation of the valve-plug may also be by power, as by fluid pressure.

The accompanying drawings illustrate my invention. In those drawings:

Fig. 1 is a longitudinal section through a rotary valve of simple form embodying my invention, with a cylindrical valve-plug in closed position and with a single mechanically actuated sealing sleeve in sealing position;

Fig. 2 is a horizontal section on the line 2—2 of Fig. 1;

Fig. 3 is a perspective view of the operating sleeve of Fig. 1;

Fig. 4 is a plan of the valve-plug and the sealing sleeve carried by it, and of the sleeve-operating cam, with the valve-stem and operating sleeve in section on the line 4—4 of Fig. 1;

Fig. 5 is a side elevation of said valve-plug and sealing sleeve, as viewed from the left of Fig. 1, with the upper part of the valve-stem broken away, and with the operating sleeve and its sleeve-operating cam removed;

Figs. 6, 7, and 8 are plans, in partial section, of the valve-plug of Fig. 1 and its operating mechanism, and parts of the valve-casing; with the valve-plug in closed and sealed position, in closed and unsealed position, and in open position respectively, and with the sliding sleeve shown as a unit to avoid complication;

Figs. 9, 10, and 11 are fragmental side elevations, in partial section in Fig. 11, of the valve-stem and its locking cross-pin for the valve positions corresponding to Figs. 6, 7, and 8, respectively;

Figs. 12, 13, and 14 are fragmental vertical sections through the valve-casing cap, with the locking cross-pin in the positions it has for the valve positions of Figs. 6, 7, and 8 respectively;

Fig. 15 is a longitudinal section through a modified valve embodying my invention, with a tapered valve-plug in closed position, and with a single hydraulically actuated sealing sleeve in sealing position;

Fig. 16 is a fragmental view showing on an enlarged scale a fragment of one end of the sealing sleeve of the valve of Fig. 15, and adjacent parts, including the auxiliary valves operated by the sealing sleeve movement;

Fig. 17 is a plan of the upper end of the valve-stem of the valves of Figs. 15 and 19;

Fig. 18 is a longitudinal section through another modified valve embodying my invention, with a spherical valve-plug in closed position, and with two toggle-actuated sealing sleeves, one for each valve-port, in sealing position;

Fig. 19 is a longitudinal section through still another modified valve embodying my invention, also with a spherical valve-plug in closed position, and with two hydraulically actuated sealing-sleeves, one for each valve port, in sealing position;

Fig. 20 is a fragmental view showing on an enlarged scale a fragment of one sealing sleeve of the valve of Fig. 19, and adjacent parts, including auxiliary valves operated by the movement of that sealing sleeve;

Fig. 21 is a detail of one of the check-valves in the valve-plug of Fig. 19;

Fig. 22 is a longitudinal section through still another valve embodying my invention, also with a spherical valve-plug in closed position, and with two mechanically actuated sealing-sleeves, one for each valve-port, in sealing position;

Fig. 23 is a fragmental view showing on an enlarged scale a fragment of one sealing sleeve of the valve of Fig. 22, and adjacent parts, including some of the operating gearing; and Fig. 24 is a horizontal section on the line 24—24 of Fig. 22.

In the simple form of valve shown in Figs. 1 to 14 inclusive, a valve-casing 30 has a removable cap 31, and rotatably mounted in that valve-casing is a valve-plug 32. The valve-casing 30 has an inlet port 33 and an exhaust port 34; and the valve-plug 32 is rotatable within the valve-casing between the closed position shown in Figs. 1, 2, 6, and 7 and the open position shown in Fig. 8. The valve-plug and the valve-casing co-operate on surfaces of revolution in that rotatable movement of the valve-plug; these surfaces of revolution may be a simple circular cylinder as shown in Figs. 1 to 14 inclusive, or other surfaces of revolution, such as the cone of Fig. 15 or the sphere of Figs. 18, 19, and 22, in any case having as its axis the axis of rotation of the valve-plug.

For that rotation, the valve-plug has a lower trunnion 35 rotatably fitting in a bushing 36 mounted in the valve-casing 30 (Fig. 1), and a second trunnion or valve-stem 37 rotatably fitting in an operating sleeve 38; which in turn fits rotatably within a boss 39 formed in the valve-cap 31. The operating sleeve 38 has an axial upward extension 40 extending through a packing 41 carried within an extension of the boss 39, and projects beyond that packing for manual operation, as by having a squared end 42 for receiving a manual operating handle 43.

The valve-plug 32 has a transverse tubular portion 50 which provides a fluid passage 51 interconnecting the ports 33 and 34 when the valve is open, as is shown in Fig. 8, and lying across the line between those ports when the valve is closed, as is shown in Figs. 1, 2, 6, and 7. Preferably the inlet and outlet ports 33 and 34 are in line with each other, at diametrically opposite ends of the valve-casing 30, as the drawings show, and the passage 51 extends diametrically of the valve-plug; but these locations are not essential.

The valve-plug 32 also has two transverse cylindrical projections 53 and 54 in the same plane transversely of the valve-plug axis as is the tubular portion 51 but transverse to that tubular portion, preferably perpendicular thereto. These projections 53 and 54 close the ports 33 and 34 when the valve is in the closed position of Figs. 1 and 2; and have their outer ends shaped to fit the inner ends of those ports for close sliding movement as the valve-plug is turned; this makes those outer end portions cylinders on the axis of the valve-plug in the valve of Figs. 1 to 14 inclusive. Sleeves 55 and 56 are slidably mounted on the extensions 53 and 54; and are connected from movement together by a saddle 57 surrounding the lower end of the operating sleeve 38 and suitably attached to those sleeves 55 and 56, as by screws 58. The saddle 57 is rectangular in cross-section, and co-operates with radial cams 59 and 60 provided at suitably spaced circumferential points on the operating sleeve 38 at or near its lower end. In the structure shown, the cams 59 and 60 have their high points 135° apart. The rectangular opening within the saddle 57 is amply wide in the direction transverse to the axis of the sleeves 55 and 56 to receive freely the uncammed portion of the lower end of the operating sleeve 38; while in the direction of that axis its dimension is greater by the height of one of the cams 59 and 60 than the diameter of that uncammed portion. Thus when the operating sleeve is in the position shown in Fig. 4 with respect to the valve-plug, the cam 60 is acting on the saddle 57 to push the sleeves 55 and 56 slightly to the left along the projections 53 and 54; while when the operating sleeve 38 is turned 45° clockwise with respect to the valve-plug position shown in Fig. 4 the cam 59 will have acted on the saddle 57 to push the sleeves 55 and 56 to the right in Fig. 4 from the position shown in that figure and in Fig. 6 to the position shown in Fig. 7.

The inner ends of both ports 33 and 34, and especially of the outlet port 34, have valve-seats 61 and 62, for co-operating with the ends of the tubular portion 50 of the valve-plug and with the projections 53 and 54, according to the valve position. The valve-seat 62 also co-operates with the sliding sleeve 56, which is the sealing sleeve, for which purpose the valve-seat 62 and the sliding sealing sleeve 56 at their adjacent ends have mating conical valve surfaces. Piston rings 56' are preferably provided in the projection 54 to bear against the inside of the sealing sleeve 56, to seal it. These mating valve surfaces are brought into sealing contact when the sealing sleeve 56 is moved to the left, to the position shown in Figs. 2 and 6, when the cam 60 has pushed the saddle 57 and the sleeves 55 and 56 to the left; but are moved out of engagement when the sleeves 55 and 56 are moved to the right, as shown in Fig. 7, by the turning of the operating sleeve 38 to cause the cam 59 to move the saddle 57 to the right.

The valve-stem 37 has a longitudinal slot 65 through it, as is clear from Figs. 9, 10, and 11. A locking cross-pin 66 extends through this slot 65, and is slidable longitudinally, of the slot between the lower position shown in Figs. 1 and 9 and the upper position shown in Figs. 10 and 11. The locking cross-pin 66 is preferably square in its central portion, where it fits slidably within the slot 65; but projects out of the slot 65 at both ends, and on each projecting end carries two rollers 67 and 68. The two inner rollers 67 lie in two similar helical camming slots 69 extending through the wall of the operating sleeve 38. These camming slots 69 have their upper and lower ends of the levels of the upper and lower ends respectively of the slot 65 in the valve-stem 37, and extend circumferentially 45° plus the diameter of a roller 67. The outer rollers 68, on the outer ends of the locking cross-pin 66, lie in two similar angle-slots 70 provided in the inner face of the boss 39. Each angle-slot 70 has a longitudinal portion extending from the under face of the valve-cap 31 to the level of the top of the slot 65, and a lateral portion extending circumferentially, 90° clockwise in the valve shown, from the upper end of the longitudinal portion, as is clear from Figs. 12, 13, and 14. The cross-pin 66 with its rollers 67 and 68 thus works in five slots—the longitudinal slot 65 in the valve-stem 37, the two helical camming slots 69 in the operating sleeve 38, and the two angle-slots 70 on the inner face of the boss 39.

The operation of the valve of Figs. 1 to 14 inclusive is as follows:

When the valve is in closed position, as shown in Figs. 1 and 2, the tubular portion 50 of the valve is transverse to the line between the inlet and outlet ports 33 and 34, and the projections 53 and 54 cover those two ports. But that covering is not wholly relied on for the sealing closing of the valve; instead, the sliding sleeves 55 and 56 are in their left-most position (Figs. 1 and 2) so that the mating surfaces of the sealing sleeve 56 and of the valve-seat 62 are in sealing engagement to seal the valve against fluid flow through it. This sealing engagement is enhanced and augmented by the fact that fluid pressure from the inlet port 33 has access beyond the end of the projection 53 to the space within the valve-casing around the valve-plug. That fluid pressure acts on the exposed surfaces of the sleeves 55 and 56 (the pressures on sleeve 55 cancel out) to produce a resultant unbalanced pressure holding the sleeve 56 against the outlet valve-seat 62, and the mating surfaces of that valve-seat and the sealing sleeve 56 in tight engagement; because by reason of the fact that no fluid pressure is acting on those mating surfaces when the valve is closed there is more surface on which the fluid pressure acts to push those sleeves 55 and 56 toward the valve-seat 62 than there is in the opposite direction.

Thus when the valve is closed, as shown in Figs. 1 and 2, the sealing is very effective to prevent fluid flow through the valve.

When it is desired to open the valve, the manual operating handle 43 is suitably turned; clockwise in the valve shown, and through a total distance of 135°. This turning movement of the handle 43 has two portions: the first 45° moves the sleeves 55 and 56 to separate the mating surfaces of the sleeve 56 and valve-seat 62, and the remaining 90° moves the valve-plug to bring the projections 53 and 54 out of line with the inlet and outlet ports 33 and 34 and the tubular portion 50 into line with those ports. The valve parts are shown in closed position in Figs. 1, 2, 6, 9, and 12; at the end of the first 45° of opening movement of the handle in Figs. 7, 10, and 13; and in final open position in Figs. 8, 11, and 14.

In the 45° movement referred to, the operating handle 43 turns the operating sleeve 38 with it, but does not turn the valve-plug or valve-stem. This movement of the operating handle thus produces a relative turning between the operating sleeve 38 and the valve-stem 37, for turning movement of the valve-stem 37 is prevented by the cross-pin 66 and the co-operation of the rollers 68 with the longitudinal portions of the slots 70. By that relative movement, the helical camming slots 69 in the operating sleeve 38 act on the rollers 67 to lift the cross-pin 66 from the bottom to the top of the vertical slot 65, and to the plane of the circumferential portions of the slots 70; as is clear by comparison of Figs. 6, 9, and 12 with Figs. 7, 10, and 13. When the cross-pin 66 reaches that latter position, the rollers 68 are out of the vertical portions of the slots 70, and thus the locking of the valve-stem 37 against turning is released.

During that 45° relative movement between operating sleeve and valve-stem, the radial cams 59 and 60 move clockwise from the position shown in Figs. 4 and 6 to the position shown in Fig. 7. By this movement the cam 60 ceases to hold the saddle 57 leftward, and the cam 59 pushes that saddle rightward; and the movement of the saddle rightward moves the sleeves 55 and 56 correspondingly rightward, to open the sealing engagement between the sleeve 56 and the valve-seat 62; as is clear from a comparison of Figs. 6 and 7.

After the aforesaid release of the valve-stem locking the continued movement of the operating handle 43 for the next 90° of clockwise movement turns the operating sleeve 38 and valve-stem 37 as a unit, by the action on the rollers 67 and 68 of the slots 69; and thus rotates the whole valve-plug and associated parts from closed to open position. This movement is clear from a comparison of Figs. 7, 10, and 13 with Figs. 8, 11, and 14.

To close the valve, the handle 43 is turned in the opposite direction—counter-clockwise as shown. (The directions of the opening and closing movements of the valve may of course be just the reverse, by simply making the slots 69 and 70 mirror images of those shown.)

In the closing movement of the valve, the first 90° of the movement moves the tubular portion 50 out of line and the projections 53 and 54 into line with the ports 33 and 34. The remaining 45° of the movement shifts the sleeves 55 and 56 leftward (Figs. 1 and 2) to produce sealing engagement between the mating surfaces of the sleeve 56 and the valve-seat 62.

This is controlled by the cross-pin 66 and the slots 65, 69, and 70. As the closing movement starts from the farthest open (clockwise) position, the rollers 68 roll along the circumferential portions of the slots 70, and those circumferential portions hold the cross-pin from descending. In consequence, the valve-stem 37 and operating sleeve 38 move as a unit, and carry the whole valve-plug with them. At the end of the 90° movement, the rollers 68 pass out of the circumferential portions of the slots 70, and into the upper ends of the vertical portions of those slots. As the closing movement of the operating handle then continues, the rollers 68 prevent the valve-stem and valve-plug from farther movement counter-clockwise; but the operating sleeve 38 continues that clockwise movement, to produce relative counter-clockwise movement of the operating sleeve on the valve-stem 37, and the helical camming slots 69 force the rollers 67 and the cross-pin 66 downward in the slot 65 and in the vertical portions of the slots 70. By that relative movement the radial cams 59 and 60 are moved from their farthest clockwise position in the saddle 57 (Figs. 7 and 8) toward and to their farthest counter-clockwise position (Figs. 1, 4, and 6). This moves the cams 59 out of engagement and the cams 60 into engagement with the right-hand and left-hand ends of the saddle 57; and the cam 60 forces the saddle 57 and the sleeves 55 and 56 to the left (Fig. 4) to produce the desired sealing engagement between the mating surfaces of the sleeve 56 and the valve-seat 62 shown in Fig. 2.

The modified valve shown in Figs. 15, 16, and 17 differs from the valve shown in Figs. 1 to 14 inclusive mainly in that the sealing sleeve is wholly hydraulically operated instead of being mechanically operated; and its valve-plug is conical instead of cylindrical. (The valve of Figs. 1 to 14 inclusive also has an element of hydraulic operation in the holding of the sealing sleeve in closed position.) The hydraulic operation of the sealing sleeve in the valve of Figs. 15, 16, and 17 is by fluid pressure derived from the fluid controlled by the valve. That fluid-pressure acts in both axial directions on the sealing sleeve, under control which permits the release of fluid-pressure acting in either selected direction.

The valve of Figs. 15, 16, and 17 has a valve-casing 30, valve-cap 31, valve-plug 32, operating sleeve 38, and a manual manipulating handle 43, of the same general character as in the valve of Figs. 1 to 14 inclusive, save that the valve-plug is conical instead of being cylindrical. The valve-plug is moved 90° about its axis between the closed position shown in Fig. 15 to an open position by a movement of the manual manipulating handle 43 and the operating sleeve 38 in the same general manner as in the valve of Figs. 1 to 14 inclusive; and the connection between the operating sleeve 38 and the valve-stem 37 is by mechanism substantially the same as that in the valve of Figs. 1 to 14 inclusive, including the locking cross-pin 66 co-operating with a longitudinal slot 65 in the valve-stem, with helical slots 69 in the operating sleeve 38, and with angle slots 70 in the valve cap like those of the valve of Figs. 1 to 14 inclusive. As a result, in the valve of Figs. 15, 16, and 17, as in the valve of Figs. 1 to 14 inclusive, the opening movement of the operating handle 43 is for 45° while the valve-plug remains stationary and the locking cross-pin 66 is moved upward in the longitudinal portions of the angle slots 70, and then for 90° in which it carries the valve-plug with it from open to closed position as the rollers 68 on the ends of the cross-pin 66 move in the circumferential portions of the angle slots 70; while in the closing movement of the valve the first 90° of movement of the operating handle 43 moves the valve-plug with it as the rollers 68 roll in the other direction in the circumferential portions of the angle slot 70, and the remaining 45° does not move the valve-plug but moves the cross-pin 66 downward in the longitudinal portions of those angle slots 70 as the valve-plug is held against further movement.

In the valve of Figs. 15, 16, and 17 there is a single sealing sleeve 75 mounted in and slidable transversely of the valve-plug. At one end the sealing sleeve 75 has a conical valve surface which by the sleeve movement while the valve-plug is at rest in closed position is moved into and out of sealing engagement with a mating valve surface around the valve seat 62 at the outlet port 34. This sealing sleeve 75 has an outwardly extending circumferential flange 76 (see especially Fig. 16), which co-operates with the ends of two passageways 77 and 78 provided in the valve-plug and its valve-stem 37 and opening through the upper end of that valve-stem. The passageway 77 has a simple opening at the upper end of the valve stem; but the passageway 78 terminates at that upper end of the valve stem in an arc-shaped groove 79 in the upper face of the valve stem, as is clear from Figs. 15 and 17. In the stem of the operating sleeve 38 there is a longitudinal passageway 80 having a radial lower end which overlies the upper end of the passageway 77 when the valve is fully closed, but overlies the arc-shaped groove 79 as soon as the operating sleeve 38 is moved relative to the valve-stem 37 away from fully closed position. Thus in fully closed position, shown in Figs. 15 and 16, the passageway 77 and the left side of the flange 76 are open to the atmosphere through the passageway 80; while when the operating sleeve 38 is moved out of that fully closed position the passageway 78 and the right side of the circumferential flange 76 are open to the atmosphere. A clearance space 81 around the outside of the sealing sleeve 75 admits fluid pressure to both sides of the circumferential flange 76, which fluid pressure comes from the line pressure existing inside the valve-casing.

Thus when the valve is in fully closed position, shown in Fig. 15, fluid pressure acts on the right side of the circumferential flange 76, because the passageway 78 is closed, while the passageway 77 and left side of the flange 76 are not under fluid pressure because that passageway is open to the atmosphere through the passageway 80. In consequence, in that situation with the valve closed, the unbalanced leftward pressure on the circumferential flange 76 forces the sealing sleeve 75 leftward to sealing position, with its valve surface in contact with the valve-surface around the outlet port 34. But when the operating handle 43 and operating sleeve 38 are moved out of fully closed position, and in consequence the passageway 78 is open to the atmosphere through the arc-groove 79 and the passageway 80, the unbalancing of pressure on the flange 76 is reversed; for then the right side of that circumferential flange is open to the atmosphere, while because of the closing of the passageway 77 the left side of the circumferential flange 76 is subjected to the fluid pressure of the line. Preferably the endwise movement of the sealing sleeve to left and right respectively carries the circumferential flange 76 into contact with the lower ends of the passageways 77 and 78 respectively; to close those passageways when they are open to the atmosphere, and thus to prevent continuous leakage of fluid through the passageway 80; to facilitate which closing the circumferential flange 76 desirably has each of its faces lined with a gasket 82 of yielding material.

In the operation of the valve of Figs. 15, 16, and 17, the sealing sleeve 75 is in sealing position when the valve is closed, as is shown in Fig. 15. When the operating handle is moved toward open position, it first moves the operating sleeve 38 without moving the valve-plug, under the control of the cross-pin 66 and its associated slots. In this movement the passageway 80 is moved away from the upper end of the passage 77 and over the arc-shaped grooves 79; and the fluid pressure thus admitted to the left side of the circumferential flange 76 while the pressure on the right side of that flange is released through the port 80, causes the sealing sleeve to move to the right, to unsealing position. Then, after the sealing sleeve has been so moved while the cross-pin 66 is being moved upward in the slot 65 in the valve-stem, the continued opening movement of the operating handle moves the valve-plug with the operating sleeve 38, to open the valve. The reverse takes place in the closing movement of the operating handle 43; for then in the first 90° of the movement of that handle the valve stem is turned with the operating sleeve 38 to move the valve-plug to closed position, after which the operating sleeve 38 continues while the valve-plug and valve-stem remain stationary, as the cross-pin 66 is moved downward in the slot 35. At about the end of the closing movement of the operating handle, the lower end of the passageway 80 moves from a position over the arc-shaped slot 79, and into position over the upper end of the passageway 77. This opens the left side of the flange 76 to the atmosphere, while closing the right side thereof against access to the atmosphere, and the resultant unbalanced pressure forces the sealing sleeve leftward to its sealing position shown in Figs. 15 and 16.

The modified valve of Fig. 18 has two sealing sleeves, one for each of the inlet and outlet ports; and these two sleeves are mechanically operated, but by a different mechanism from that used for operating the single sealing-sleeve of the valve of Figs. 1 to 14 inclusive. In addition, the valve of Fig. 18 is shown as a spherical valve; and for that reason its valve-casing 30 is made in two parts and with a removable trunnion-bearing at the bottom, to permit assembly and disassembly around the generally spherical valve-plug. The dividing line between the two parts of the casing is shown as an oblique dividing line, with the two parts held together by clamping screws 85, connecting lugs 86 on the two valve-casing parts.

The valve of Fig. 18 has the same manual operating handle 43 as have the valves already described, and it operates the same operating sleeve 38; which in turn is connected by a locking cross-pin 66 to the valve-stem 37 that has already been described, through helical slots in the operating sleeve and angle slots in the valve-cap 31 as already described; so that in and near closed position of the valve the movement of the operating handle turns the operating sleeve only, without turning the valve-stem 37 or the valve-plug, while in positions at and near the open position of the valve the valve-stem 37 is locked to the operating sleeve 38 to turn with it.

The vertical movement of the cross-pin 66 also operates the two sealing sleeves 82 and 83, which are slidable radially outward and inward together when the valve is in closed position into and out of sealing engagement with mating surfaces around the valve seats 61 and 62. Fig. 18 shows the parts in sealing position. The sealing sleeves 82 and 83 move outward together and inward together, and are connected by toggle links 84 to an axial rod 85 attached at its upper end to the cross-pin 66 so that it moves upward and downward with that cross-pin. When that cross-pin is down, the toggles are straightened, to push the two sealing sleeves outward into sealing position; whereas when the cross-pin 66 is raised the rod 85 is also raised to collapse the toggles and pull the two sealing sleeves 82 and 83 inward. Because it has two sealing sleeves, the valve of Fig. 18 is suitable for controlling flow of fluid in either direction.

The modified valve of Figs. 19, 20, and 21 has a spherical valve-plug and a split valve-casing, and two sealing sleeves for both valve-casing ports so that the valve is suitable for controlling fluid-flow in either direction, as in the valve of Fig. 18; but it differs from the latter valve in that the sealing sleeves are actuated hydraulically instead of mechanically. Each sealing sleeve is substantially a duplicate of the sealing seeve of the valve of Fig. 15, with controlling passages and ports like those of Fig. 15 save that the passageways 77 and 78 lead in common to the outer and inner sides of flanges 76 on both sleeves. Thus under the action of the hydraulic pressure and the outlets to the atmosphere the two sealing valves move outward together and inward together.

To supply that hydraulic pressure from the line pressure, each of the projections 53 and 54 is provided with a passage 90 extending from the end of the projection into the main fluid passage 51; and each of the passageways 90 is provided with a check valve for admitting pressure from whichever casing port is under the higher pressure to the inside of the valve-casing, which in turn normally communicates with the spaces on both sides of both flanges 76. Such a check valve is shown in Fig. 21, and in the form there shown is a ball check valve, with a ball 91 acting against a sealing seat-member 92 screwed into an enlargement in the outer end of the passageway 90.

Preferably, as in the valve of Fig. 15, any passage to the atmosphere is closed by the movement of the flange 76 to either end of its stroke. The means for doing it in the valve of Fig. 19 is somewhat more elaborate than that shown in Fig. 15, and is shown in detail in Fig. 20. The flange 76, as in Fig. 18, desirably has a facing of gasket material on each side; but instead of co-operating simply with the open end of the passageway, it co-operates with a spring-pressed tubular plunger 95 yieldingly pressed toward the flange by a spring 96 in an enlargement at the end of the passageway. The movement of the tubular plunger 95 toward the flange 76 is limited by a screw plug 97 co-operating with a flange 98 on such tubular plunger. The screw plug 97 provides a ready means for adjusting the stroke and the sealing effect.

The valve shown in Figs. 22, 23, and 24, also like the valve of Fig. 18, has a spherical valve-plug, and an obliquely split casing; and has a general movement like the other forms of valve shown in that a sealing sleeve or sleeves are moved into and out of sealing position while the valve-plug proper remains at rest during the latter part of the valve-closing movement and the early part of the valve-opening movement respectively. The valve of Figs. 22, 23, and 24 also has two sealing sleeves 100, but instead of a simple radial sliding movement into and out of sealing position they are moved into and out of sealing position by helical movements; for which purpose they are mounted on the projections 53 and 54 by co-operating helical slots and grooves 101 (Figs. 22 and 23) so arranged that as the sleeves 100 are turned about their axes they advance or retreat radially. The turning movements of the sealing sleeves 100 about their axes obtain through helical pinions 102 meshing with helical gear teeth on the inner ends of the sleeves 100, as is clear from Fig. 22. The helical pinions 102 are at the outer ends of shafts 103 suitably mounted in the valve-plug structure as shown in Fig. 22, which shafts 103 at their inner ends are provided with beveled gears 104 meshing with a similar beveled gear 105 at the lower end of an axial shaft 106 extending upward through the valve stem 107. The shaft 106 is provided at its upper end with a worm gear 108 co-operating with a worm 109 carried in any suitable member and provided with an operating wheel 110. (Fig. 22.) The upper end of the valve stem 107 is square (or otherwise non-circular) externally, and longitudinally slidable upon it is the hub 111 of a cross-pin 112 in general corresponding to the cross-pin 66 of the valves already described. The cross-pin 112, like the cross-pin 66 already described, is provided with rollers 67 and 68, which co-operate with helical slots 69 and angle slots 70 similar to those already described but in this case provided in the valve-actuating member 38' carried by and depending from the worm gear 108 and with a stationary circular flange 113 rigid with the valve-casing.

The operation is substantially similar to that of the valves already described, under the control of the cross-pin 112 and its associated slots.

Preferably the adjacent ends of the two shafts 103, which are alined with each other, are pressed apart by a centering spring 115, as is clear from Fig. 22; and to permit that spring to act the two beveled gears 104 are splined on the respective shafts 103. The spring 115, and the helical nature of the gears 102, permits sufficient yielding to provide firm seating of both sealing sleeves against their valve seats.

I claim as my invention:

1. A rotary valve comprising a valve casing having a communication chamber, inlet and outlet ports in said casing connected with said chamber, a valve plug mounted in said chamber for rotation between open and closed positions and having an open-port conduit which connects said inlet and outlet ports when in open position, and a close-port portion which restricts fluid flow between said inlet and outlet ports when in closed position, a hollow member slidably mounted on and sealingly surrounding said close-port portion for engaging and sealing and disengaging and unsealing movements, with respect to the wall of said casing around one of said ports and radially of the axis of rotation of said plug, and driving means connected with said plug and said hollow member for causing said movements.

2. A rotary valve as set forth in claim 1, wherein said inlet and outlet ports are circular, said open-port conduit and close-port portion have oppositely extending cylindrical ends, and said hollow member is of cylindrical configuration snugly embracing said close-port portion of the valve plug.

3. A rotary valve as set forth in claim 1, wherein said driving means embodies a cam operable to shift the hollow member on the close-port portion of the valve plug.

4. A rotary valve as set forth in claim 1, wherein said driving means embodies a manually operable handle drivingly connected with the valve plug to turn the same, said driving means also embodying a cam operable to shift the hollow member on the close-port portion of the valve plug.

5. A rotary valve comprising a valve casing having a communication chamber, inlet and outlet ports in said casing connected with said chamber, said ports forming valve seats providing shoulders facing into said chamber, a valve plug mounted in said chamber for rotation between open and closed positions and forming a cylindrical open-port conduit adapted to interconnect said ports when in open position, said valve plug embodying a cylindrical close-port portion adapted to restrict fluid flow between said ports when in closed position, a hollow member sealingly fitted upon and having balanced sliding movement on and with respect to said close-port portion, radially of the axis of rotation of said plug, said hollow member being positioned for sealing engagement with a said valve seat when in closed position, and for unsealing movement radially of the axis of rotation of the plug prior to rotation of the plug to its open position, and a control member connected with said hollow member and said plug and operable to cause said movements.

6. A rotary valve comprising a valve casing having a communication chamber, inlet and outlet ports in said casing connected with said chamber, a ported valve plug mounted in said chamber for rotary movement between open and closed positions in which it respectively interconnects and disconnects said ports, a hollow member surrounding and sealingly fitted upon said plug in position to seal with the wall of said casing around a said port when the valve plug is in closed position, said hollow member being movable radially of the axis of rotation of said plug to engage and disengage the wall of said casing around said port, to thereby seal and unseal the same, and valve operating means connected with said plug and hollow member to cause movement thereof.

7. A rotary valve comprising a valve casing having a communication chamber, inlet and outlet ports in said casing connected with said chamber, said ports forming valve seats having outside engaging surfaces facing into said chamber, a valve plug mounted in said chamber for rotation between open and closed positions and having an open-port conduit which interconnects said ports when the plug is in open position, said plug embodying a close-port portion which restricts fluid flow between said ports when the plug is in closed position, and a hollow member sealingly fitted upon said close-port portion for valve seat engaging and sealing and disengaging and unsealing movements, radially of the axis of rotation of said plug, said plug being turnable to restrict fluid flow through said valve seats by shearing the flow area of said ports to initially restrict fluid flow, said hollow member serving to accomplish a final sealing action by abutment of said outside engaging surfaces of a said valve seat with an end of said tubular coupling member, and operating means connected with said plug and hollow member for moving the same.

8. A rotary valve comprising a valve casing having a communication chamber, inlet and outlet ports in said casing connected with said chamber, a ported valve plug rotatably mounted in said chamber for turning movement in opposite directions between valve open and valve closed positions in which it respectively interconnects and disconnects said ports, a hollow member carried on and sealingly fitted with said plug for radial movement outwardly and inwardly with respect to the rotary axis of said plug between closed position, in which it engages and seals, and open position, in which it is disengaged from and unsealed with respect to the wall of said casing around a said port, and driving means connected with said plug and said tubular coupling member for causing said movements.

9. A rotary valve as set forth in claim 8, wherein said driving means includes coupling means connected with said plug and hollow member, to coordinate the movements thereof.

10. A rotary valve comprising a valve casing having a communication chamber, inlet and outlet ports in said casing connected with said chamber, a valve plug having upper and lower supports rotatably mounted in said chamber for turning movement between open and closed positions, said plug forming an open-port conduit which interconnects said ports when the plug is in valve open position, said plug having a close-port portion which restricts fluid flow between said ports when the plug is in valve closed position, and a hollow member mounted for movement radially of the axis of rotation of said plug between closed position, in sealing engagement with the wall of said casing around a said port and with said close-port portion of the plug, and open position, in which it is disengaged from and unsealed with respect to the wall of said casing around said port to initiate valve opening operation, said upper and lower supports being connected with a common driving member having actuating means and a linkage connecting said hollow member and said plug to cause said radial and rotary movements thereof.

11. A rotary valve comprising a valve casing having a communication chamber, inlet and outlet ports in said casing connected with said chamber, a ported valve plug having upper and lower support portions mounted in said chamber for rotation between open and closed positions, a hollow member sealed with a portion of said plug and with the wall of said casing around a said port when said plug is in closed position, said hollow member being movable radially with respect to the axis of rotation of said plug to retracted position in which it is disengaged from and unsealed with respect to the wall of said casing around said outlet port, and actuating means including a linkage interconnected with said hollow member and said plug to cause radial and rotary movements thereof.

12. A rotary valve comprising a valve casing having a communication chamber, inlet and outlet ports forming valve seats facing into said chamber, a valve plug rotatably mounted in said chamber and having four cylindrical projections extending radially of the rotary axis of the plug, an oppositely extending pair of said projections forming an open-port conduit adapted to connect said inlet and outlet ports when said plug is in valve open position, another oppositely extending pair of said projections forming close-port portions operable to restrict fluid flow through said ports when said plug is in valve closed position, a hollow member carried by said close-port portions, seal rings mounted between said close-port portions and said hollow member, the outer ends of said projections having curved surfaces configurated for rotary movement across said seats, with minimal clearance therebetween, saddle brackets connected with said hollow member and provided with cam means operable to shift the hollow member on said close-port portion, a valve stem on said plug having a cross pin therein adapted for free axial non-rotative movement with respect to the plug, a fixed valve cap member on said casing in position enclosing said plug, said cap member having a guide track therein for angular movement in opposite directions to engage said cross pin, an actuating cam member disposed between said valve stem and cap and having cylindrical cams for actuating said cross pin and said cam means to drive said hollow member, and means for applying force to said actuating cam member to cause said movements.

References Cited in the file of this patent

UNITED STATES PATENTS

| | | |
|---|---|---|
| 1,639,743 | Marsheider | Aug. 23, 1927 |
| 1,705,487 | Marsheider | Mar. 19, 1929 |
| 1,780,562 | Melling | Nov. 4, 1930 |
| 2,600,898 | Maxwell | June 17, 1952 |

FOREIGN PATENTS

| | | |
|---|---|---|
| 528,081 | Germany | 1931 |
| 546,878 | Germany | 1932 |